Patented Nov. 21, 1950

2,531,364

UNITED STATES PATENT OFFICE 2,531,364

MIXTURES OF POLYVINYL ETHERS WITH PHENOL-ACETYLENE RESINS

Ivy V. Runyan, Easton, Pa., assignor to General Aniline & Film Corporation, New York, N. Y., a corporation of Delaware No Drawing. Application April 25, 1946, Serial No. 664,976

9 Claims. (Cl. 260—45.5)

The present invention relates to a novel composition of matter comprising a mixture of a polymeric vinyl ether and a resinous condensation product of a phenol with acetylene.

In accordance with this invention, valuable compounds adapted for a wide variety of uses are obtained by mixing together a polymeric vinyl ether and a resinous condensation product of a phenol with acetylene. By varying the relative proportions of the two components within the ranges of 1:20 to 20:1 the particular properties of the resultant composition may be varied so as to produce a great number of compositions having useful properties and suitable for a wide variety of applications in the arts.

Thus, when the polyvinyl ether substituent of the mixture comprises 75% to 95% of the composition while the phenolacetylene resinous product comprises 5% to 25% of the composition, novel adhesives are obtained which possess new and valuable properties. Within this range of proportions the solutions in volatile organic solvents of these compositions are valuable for use as cementing compositions in applications where a high degree of tack and flexibility are required, while coatings of such compositions are valuable heat-sealing adhesive for use, for instance, in dry mountings for photographic films and prints and for sealing of transparent cellulosic films. On increasing the amount of the phenol-acetylene resinous product so that it forms from 25% to 85% of the resultant composition while the polyvinyl ether forms from 15% to 75% thereof, compositions are obtained which are valuable as adhesives possessing relatively little tackiness, and which are valuable for the preparation of laminated paper, wood, cloth, metal foils and the like. As the percentage of polyvinyl ether in the composition is decreased, its heat-sealing properties lessen and the flexibility of the resultant adhesive also somewhat decreases. When the amount of polyvinyl ether in the composition is decreased below 30% down to 5% while the resinous condensation product of a phenol and acetylene is increased from 70% to 95%, the resultant compositions are found to be valuable for incorporation in lacquers, varnishes and as additives for synthetic rubber and the like. Within this last-mentioned range of proportions, the resultant composition is practically devoid of tack and becomes relatively brittle as the amount of polyvinyl ether is decreased to a minimum.

As the polyvinyl ether component of the composition of the present invention may be employed the polyvinyl ethers obtained by the methods described in U. S. Patents Nos. 2,104,000 and 2,016,490, by polymerization of alkyl-, cycloalkyl- and aryl-vinyl ethers such as methyl-, ethyl-, propyl-, butyl-, isobutyl- or cyclohexyl-vinyl ethers, as well as the vinyl ethers of long chain alcohols such as the alcohols corresponding to the acids of long chain carboxylic acids, for instance the vinyl ethers of octyl-, decyl-, dodecyl-, tetradecyl-, octadecyl- and montanyl-alcohols or such aryl vinyl ethers as phenyl-, α- or β-naphthyl- and cresyl-vinyl ethers. The particular polymeric vinyl ether which is employed in the composition will depend to a large extent on the specific properties desired in the composition, and for the production of heat-sealable adhesive compositions and adhesive compositions having a relatively high degree of tack, I prefer to employ a polymer of a vinyl ether of an aliphatic alcohol containing from 1–4 carbon atoms, a substantial proportion of which is a relatively high molecular weight polymer, especially rubber-like polymers, i. e., those whose 1% solution in benzene has a specific viscosity greater than 1. While for the production of adhesive compositions it is desirable that a substantial fraction of the polyvinyl ether employed have rubber-like properties, it may contain an appreciable amount of relatively low liquid polymer which serves as a plasticizer and also increases the tack of the composition. Various other plasticizers such as dibutyl sebacate, chlorinated diphenyls, hydrogenated rosin, rosin esters and the like may be incorporated in the polyvinyl ether, if desired, in order to impart special properties to the final composition. It should also be understood that the polymeric vinyl ethers employed in the practice of this invention may be those obtained by polymerizing either a single vinyl ether or a mixture of two or more monomeric vinyl ethers or, if desired, by copolymerization of other mono-ethylenically unsaturated polymerizable compounds such as isobutylene, vinyl chloride, styrene, acrylonitrile, methyl methacrylate, methyl acrylate and the like, with a major amount of a monomeric vinyl ether of the type specified above. In order to provide a material which does not deteriorate in time or on heating, it is desirable to incorporate in the polyvinyl ether a minor amount of a stabilizer therefor. It has been found that a small amount (generally about .1% to 1%) of a rubber anti-oxidant effectively stabilizes the polymeric vinyl ether. As examples of suitable rubber antioxidants for stabilizing the polymeric vinyl ethers may be mentioned sulfur and sulfur containing organic compounds, phenols such as p-hydroxy biphenyl and various amino compounds such as p,p'-diaminodiphenylmethane, p-hydroxy-N-phenyl morpholine, N,N'-diphenylethylenediamine, phenyl β-naphthylamine and 2-mercapto-benzimidazole.

The other component of the composition of the present invention is, as stated, a resinous condensation product of a phenol and acetylene. As suitable specific compounds of this type may be mentioned those prepared by causing acetylene to react upon a phenol in the manner described in U. S. Patents Nos. 2,027,199 or 2,072,825 to Reppe et al. Specific phenols whose condensation products with acetylene have been found to be suitable for use in the composition of the present invention are phenol, the isomeric cresols, the various xylenols, carvacrol, thymol, β-naphthol, o- and p-isopropyl phenol, o- and p-tertiary butyl phenol, the tertiary amyl phenols, isomeric octyl phenols such as p(1,1,3,3-tetramethyl butyl)phenol and partially hydrogenated phenolic compounds such as tetrahydronaphthol.

The composition of this invention may be prepared by thoroughly mixing the two essential components thereof in any desired manner. Thus, the two components may be mixed by working them, either hot or cold, on a rubber mill or in a mechanical mixer. They also may be mixed, particularly if the resultant composition is to be employed as a solution, by dissolving the phenol-acetylene resinous product and the polyvinyl ether either separately or together in a volatile organic solvent. Suitable solvents for this purpose are such aliphatic and aromatic hydrocarbons as low boiling petroleum fractions, benzene, toluene and xylene; ketones such as methyl-ethyl ketone and dibutyl ketone; halogenated hydrocarbons such as chloroform, carbon tetrachloride, ethylene dichloride, trichloroethylene and tetrachloroethylene; aliphatic alcohols, e. g., propyl alcohol, isobutyl alcohol, normal butyl alcohol and the amyl alcohols; ethers, such as diethyl ether, dibutyl ether and dioxane; and esters, such as ethyl butyrate, butyl acetate and amyl acetate and mixtures of the above-mentioned solvents.

In order to further illustrate the invention, the following specific examples of preferred embodiments thereof are given. Parts are by weight:

Example 1

A mixture of 36 parts of polyvinyl isobutyl ether and 4 parts of the resinous product of tertiary butyl phenol and acetylene is worked on a rubber mill for 30 minutes. The milled product is then dissolved in 80 parts of a hydrocarbon fraction boiling between 83° and 127° C. The solution is then cast on glassine paper by spreading with a doctor knife to obtain a coating of 1-2 mils thickness on both sides of the paper. The resultant coated paper is employed as a dry mounting tissue for gelatin-coated photographic film and photographic prints by gentle heating of the surface with an ordinary household flat-iron or a standard dry-mounting press. The photographic films and the photographic print adhere tightly to the mounting.

Similar mixtures in which the polyvinyl ether formed from 75% to 95% of the composition and the phenol-acetylene resinous product formed from 25% to 5% thereof, were found to be valuable cementing compositions when dissolved in solvents of the type heretofore mentioned for applications where a high degree of flexibility and tackiness was desired. The dried coatings of such cementing compositions on such materials as paper, metal foil, cellophone, cellulose acetate and the like were found to be good heat-sealable adhesives.

Example 2

A mixture of 10 parts of polyvinyl n-butyl ether and 20 parts of tertiary butyl phenol-acetylene condensation product is dissolved in 70 parts of toluene and the solution is filtered to remove traces of insoluble product. The resultant solution is employed for laminating cotton fabric to cotton fabric, and cotton fabric to aluminum foil and to paper.

Similar compositions in which the polyvinyl ether formed from 60% to 15% of the composition while the phenol-acetylene resinous product formed from 40% to 85% thereof were found to possess similar properties, and solutions in solvents of the type heretofore described were employed as adhesive compositions where good flexibility was required but little tackiness was desired in the dried adhesive. As the amount of polyvinyl ether was decreased below about 30%, the resultant composition was found to be devoid of tack, although it still contained a high degree of adhesiveness and remained relatively flexible until the amount of polyvinyl ether was decreased below about 15%, at which time some brittleness was noted in the dry coatings obtained.

I claim:

1. A composition of matter consisting essentially of a mixture of from 5% to 95% of a solid rubber-like homopolymer of a vinyl ether of a lower alkanol and from 95% to 5% of a toluene soluble resinous condensation product of a phenol with at least an equivalent molecular proportion of acetylene.

2. A heat-sealable adhesive composition consisting essentially of from 75% to 95% of a solid rubber-like compound consisting of a homopolymer of a vinyl ether of a lower alkanol and from 25% to 5% of a toluene soluble resinous condensation product of a phenol with at least an equivalent molecular proportion of acetylene.

3. A composition as defined in claim 2, wherein the phenol is a tertiary alkyl phenol.

4. A composition as defined in claim 2, wherein the phenol is p-tertiary butyl phenol.

5. A composition as defined in claim 2, wherein the polymer of a vinyl ether specified consists of a polyvinyl butyl ether.

6. A composition as defined in claim 2, wherein the polymer of a vinyl ether specified consists of a polyvinyl butyl ether and the phenol specified is p-tertiary butyl phenol.

7. A composition of matter consisting essentially of from 60% to 15% of a solid rubber-like compound consisting of a polymer of a vinyl ether of a lower alkanol and from 40% to 85% of a toluene soluble resinous condensation product of a phenol with at least an equivalent molecular proportion of acetylene.

8. A composition as defined in claim 7, wherein the phenol is a tertiary alkyl phenol.

9. A composition as defined in claim 7, wherein the phenol is p-tertiary butyl phenol.

IVY V. RUNYAN.

REFERENCES CITED

The following references are of record in the file of this patent:

UNITED STATES PATENTS

| Number | Name | Date |
| --- | --- | --- |
| 2,027,199 | Reppe | Jan. 7, 1936 |
| 2,061,934 | Mueller-Cunradi | Nov. 24, 1936 |
| 2,104,002 | Reppe | Dec. 28, 1937 |
| 2,337,464 | Hecht | Dec. 21, 1943 |
| 2,395,684 | Schildknecht | Feb. 26, 1946 |